United States Patent [19]

Mathews

[11] Patent Number: 5,275,721
[45] Date of Patent: Jan. 4, 1994

[54] SWIMMING POOL SUPER-SKIMMER

[76] Inventor: Oommen Mathews, 1624 Westerfield Rd., Virginia Beach, Va. 23455

[21] Appl. No.: 14,697

[22] Filed: Feb. 8, 1993

[51] Int. Cl.$^5$ ............................................. B01D 35/00
[52] U.S. Cl. ................................. 210/169; 210/416.2; 4/490; 248/225.1; 248/297.2
[58] Field of Search ............... 210/169, 416.2; 15/1.7; 4/490; 248/225.1, 297.2

[56] References Cited

U.S. PATENT DOCUMENTS

| | | | |
|---|---|---|---|
| 2,961,098 | 11/1960 | Nash | 210/169 |
| 2,989,185 | 6/1961 | Lombardi | 210/169 |
| 3,036,712 | 5/1962 | Barbara | 210/169 |
| 3,186,550 | 6/1965 | Beduhn | 210/169 |
| 3,268,079 | 8/1966 | Sharrow, Jr. | 210/169 |
| 3,443,264 | 5/1969 | Miller | 210/169 |
| 3,616,918 | 11/1971 | Diemond | 210/169 |
| 3,633,749 | 1/1972 | Panosh | 210/169 |
| 3,970,556 | 7/1976 | Gore | 210/242.1 |
| 4,746,424 | 5/1988 | Drew | 210/169 |
| 4,781,827 | 11/1988 | Shields | 210/169 |
| 4,802,592 | 2/1989 | Wessels | 210/169 |
| 5,133,854 | 7/1992 | Horvath | 210/169 |
| 5,143,605 | 9/1992 | Masciarelli | 210/416.2 |

*Primary Examiner*—Peter Hruskoci
*Assistant Examiner*—Robert James Popovics
*Attorney, Agent, or Firm*—Donald L. Walton

[57] ABSTRACT

A portable swimming pool skimmer with a movable friction fit adjustable support holder. The friction fit support permits the skimmer to be adjusted up or down by sliding in a friction tube. The skimmer has a debris director to direct debris from along the pool side into the skimmer opening. The portable skimmer is used to save water by periodically adjusting the level of the skimmer by sliding along the holder so that the water level in the swimming pool remains in the skimmer opening so water can readily flow into the skimmer housing.

5 Claims, 1 Drawing Sheet

SWIMMING POOL SUPER-SKIMMER

BACKGROUND OF THE INVENTION

Swimming pools are generally provided with overflow or skimming devices which may be built into the wall of a below ground level swimming pool or positioned over the side of a pool wall where the swimming pool is above ground. Such skimming devices, which are permanently positioned at a point along the side wall of the pool, remove floating debris, such as bugs and leaves, from the surface of the water.

Pool skimmer systems whether used with below ground or above ground pools provide a means, such as a circulating pump, to draw the surface water from the swimming pool through a screen or strainer means. Any debris floating on the surface of the water will be retained by the strainer means. Water drawn through the skimmer is generally returned to the pool after passing through a sand or other filter media.

For permanently positioned skimmers to function properly the water level of the swimming pool must be maintained at a critical level so the water flowing into the skimmer is drawn from the surface of the water. If the water is allowed to remain at a level higher than the skimmer, which may occur due to rain, the skimmer will draw water from below the surface of the water and any debris will remain in the swimming pool. If the water level in the pool is allowed to drop below the skimmer, due to evaporation or loss of water by splashing, water will not circulate through the skimmer and skimming of debris will cease. To maintain the proper water level in the swimming pool it is the current practice to pump out any excess water as waste and to pump in fresh water when needed. Such a practice is a significant waste of water and requires additional amounts of chemicals used in treating the fresh water for maintaining the ph balance.

Another problem with permanently positioned skimmers is that they cannot be moved. Floating debris may be blown by the wind to the opposite side of the pool and held there even though the body of water below the surface is circulating. The wind thereby may defeat the purpose of the skimmer to remove floating debris.

Skimming devices designed to be supported on the edge of a swimming pool are known. Such skimming devices are shown, for example, in U.S. Pat. Nos. 3,186,550; 3,616,918; and 4,781,827. Supporting a skimmer on the edge of the pool, as shown by the U.S. patents, allows the skimmer to be positioned at any point around the pool. Selectively positioning a skimmer does overcome the wind blown debris problem; however, none of the cited patents addresses the problem of water and chemical conservation. It is known as shown by U.S. Pat. No. 4,781,827 that a portable skimmer may be provided with a support which permits a vertical adjustment allowing the skimmer basket and holder to be positioned slightly away from the pool wall and slightly below the surface of the water. Such an arrangement if not properly positioned each time the skimmer is moved may allow debris to float between the pool wall and the skimmer without being drawn into the skimmer basket.

Another problem with respect to the skimmer disclosed by U.S. Pat. No. 4,781,827 is its safety factor. Not only does the weighted support base provide a stumbling block to swimmers walking around the pool while it is in use, the vertical support pipe is a dangerous projection upon which one may fall.

SUMMARY OF THE INVENTION

The present invention is directed to a swimming pool skimmer which is compact, durable and easy to use to remove debris from the surface of the pool water. The skimmer when used in a swimming pool in the preferred manner saves water and maintenance expenses.

The skimming device comprises an elongated tubular housing having a sidewall which may be of cylindrical, square or other equivalent design. The housing includes a top closing the upper end of the sidewall and a bottom closing the lower end of the sidewall. The housing is constructed of polyvinylchloride (PVC) or other polymer resin material which is durable in water and is chlorine-resistant. An opening is provided in the upper area of the sidewall. The opening extends a substantial distance along and around the sidewall of the skimmer to provide a means for surface water and any debris floating on the water to enter the housing.

A flow connector tube is connected to the bottom or lower portion of the housing. A screen or filter means for removing the debris is located between the opening in the sidewall and the flow connector tube so water passing through the housing and out of the connector tube will pass through the filter means and be cleaned of floating debris.

To create a positive flow of pool water through the skimmer a flexible hose is attached to the flow connector tube. The flexible hose may be a corrugated tube constructed from a polymer such as PVC. The flexible hose attached to the connector tube is of sufficient length to reach the built in permanent pool skimmer located along the upper wall of a swimming pool. The flexible hose is provided with an adapter means which will fit into the intake tube in the pool skimmer. When the adapter means is connected to the intake tube a positive circulating system is provided which draws pool water through the portable skimmer and through the built in or permanent circulation system of the pool.

To support the portable skimmer to the side of the swimming pool a U-shaped clip or other equivalent means is provided at the top of an adjustable slide holder means. The U-shaped clip and the edge of the swimming pool have complimentary shapes to permit the clip to be attached to the side of the pool. The slide holder means comprises a slit tube portion attached to the U-shaped clip and a short slider tube portion attached to the skimmer sidewall and positioned in a friction fit relationship inside the slit tube portion. The slit tube portion has a predetermined length longer than the slider tube which permits the portable skimmer to be easily moved along the length of the slit tube portion to adjust the level of the skimmer to any desired skimmer position.

To aid the portable skimmer in collecting the debris from the water surface, a debris director means is attached to the sidewall portion of the skimmer and positioned between the slit-tube portion of the holder means and the wall of the swimming pool. This debris director may be constructed of a chlorine-resistant hard sponge sheet material. The director means functions as a guide directing the debris floating along the edge of the pool to the opening in the portable skimmer.

The present skimmer is not only portable but is durable and simple in its design. It is easily attached and positioned against the pool side for best operation. It is compact and provides less obstruction to the swimmers than prior art skimmers. Such obstructions, as present in the prior art devices, create hazardous projections which may cause injury to swimmers.

The present portable Super-Skimmer not only is intended to be used to skim debris from the swimming pool but also as a water and pool chemical saver when used with high and low water levels in the swimming pool. The method of using the skimmer as a water saver is set forth in the following steps: First, the water level of the swimming pool is determined to be either too high or too low for proper operation of the built in or fixed level skimmer; Second, when the water level is too high or too low the Super-Skimmer is attached to the swimming pool wall, the flexible hose filled with water and the skimmer housing adjusted with the slide adjuster so that the water level will be approximately midway from the top and bottom of the means opening in the housing; Third, the adapter at the free end of the flexible hose is attached to the pool skimmer inlet after removable of any strainer or debris collector basket from the pool skimmer; and Forth, the Super-Skimmer housing is periodically adjusted up or down to keep the water surface level of the pool in the midway range of the opening in the housing sidewall.

Using the Super-Skimmer in the above described manner, the debris is skimmed from the water surface without need to add or remove water from the pool to maintain the pool water level at which the pool skimmer will function. Through the use of the Super-Skimmer in the desired manner it is possible to obtain the most efficient use of the pool water by allowing any rain water to be used to offset the water of evaporation or loss of water through splashing. Due to the conservation of the pool water as described it is also necessary to use less chemicals to adjust the ph balance of the water, thereby, further improving the efficiency of the pool operation.

It is a primary object of this invention to provide a portable skimming device for swimming pools which is simplistic in design, durable, practical, compact, easy to install, easy to use and presents less danger to swimmers than prior art portable skimmers.

Another object of this invention is to provide a portable skimmer which is efficient in operation in removing debris from the pool water.

A further object of the invention is to provide a means for conserving water used in the swimming pool.

A still further object of this invention is to provide a means for reducing the amount of chemicals necessary to balance the ph of the swimming pool water.

An additional object of this invention is a method of using the skimmer to conserve water which also requires less chemicals to be added to maintain the ph balance of the water.

DESCRIPTION OF THE PREFERRED EMBODIMENT

Figure 1:
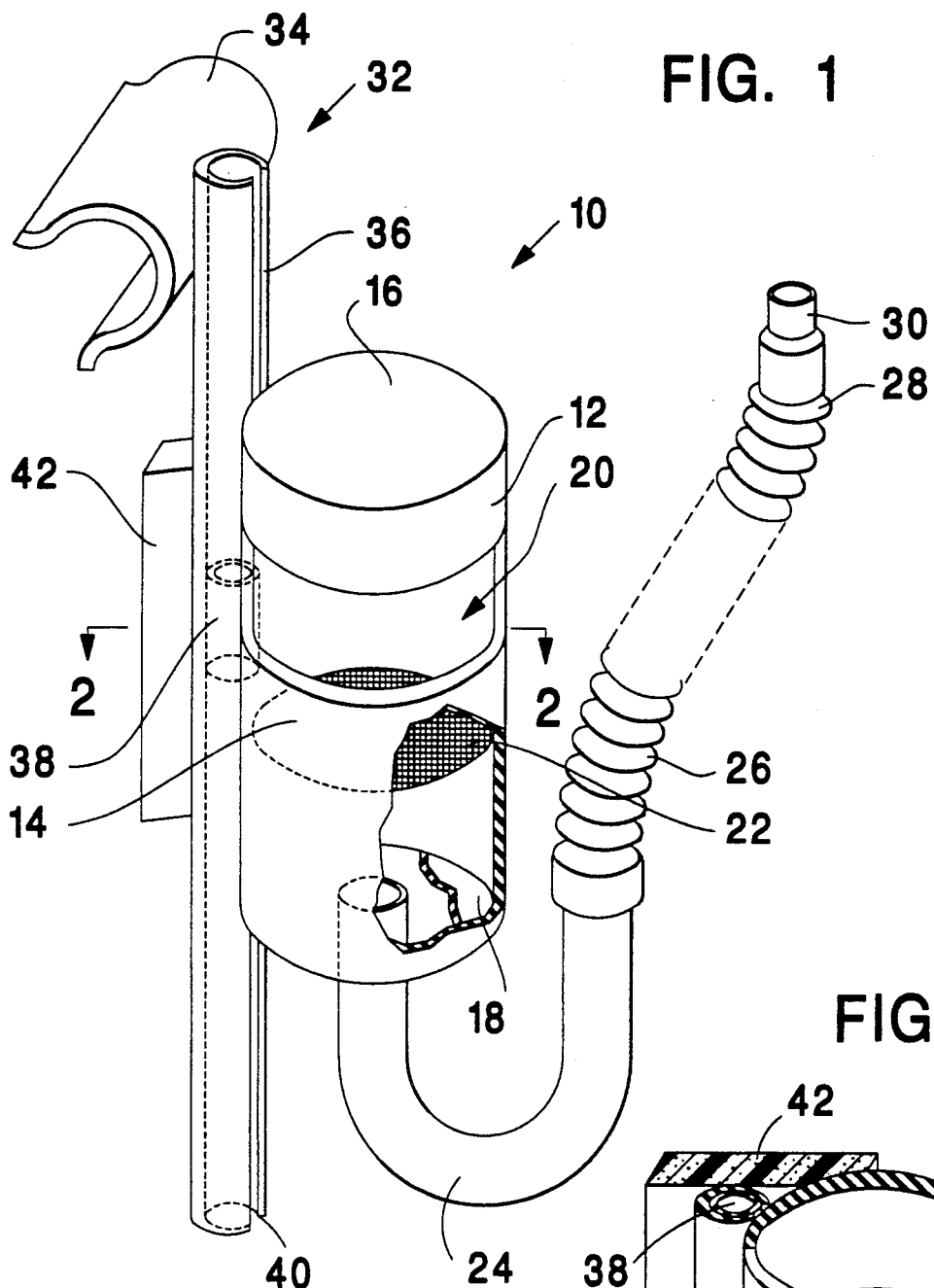
FIG. 1 is a partial cutaway perspective view of a portable skimmer.

Referring to FIG. 1, a portable skimmer device 10 of the present invention is illustrated. A cylindrical housing 12 has a sidewall 14, a top wall 16 and a bottom 18. An opening 20 is located in the upper portion of the sidewall 14 through which the water and debris enter the portable skimmer device 10. A screen 22 is attached to the inside of the housing below the opening 20 to screen any debris from the water passing through the portable skimmer. A flow connector tube 24 is attached to the bottom 18 of the skimmer at one end and connected to a flexible hose 26 at the other end. The flexible hose 26 has a free end 28 provided with an adapter 30. The hose 26 is of sufficient length to permit the adapter 30 to be attached to the input of a swimming pool skimmer when the portable skimmer is positioned at any desired location along the swimming pool edge.

The portable skimmer device 10 has an adjustable support 32 which permits the housing 12 to be quickly raised or lowered in relation to the edge of the swimming pool. To attach the portable skimmer to the edge of a pool a resilient spring slip 34 is attached to a slit tube 36. A small holder tube 38 is connected to the side of the portable skimmer sidewall 14 through slit 40 of the slit tube 36. The holder tube 38 in the slit tube 36 is frictionally held in any desired position along the slit tube 36.

Figure 2:
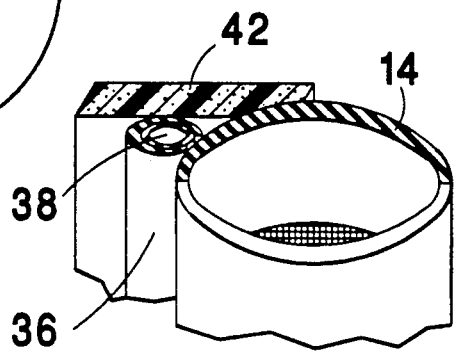
FIG. 2 is cross sectional view of the skimmer along lines A—A in FIG. 1.

Another feature of the portable skimmer is best seen by reference to FIG. 2 which is a crossectional view taken along A—A in FIG. 1.

To aid the debris floating in a pool to be directed to the opening 20 of the skimmer a director 42 of a hard foam plastic sheet material is attached to the sidewall 14 and extends out past the slit tube 36. The sheet material extends past the slit tube and is adapted to abut against the side of the swimming pool when the clip 34 is attached to the edge of a swimming pool. The director 42 has sufficient length to extend above and below the opening 20 in the sidewall 14 and directs any floating debris into the opening in the skimmer housing.

When using the portable skimmer to remove debris from a swimming pool and to save water, the portable skimmer is attached to the edge of the pool using the spring clip 34 or any equivalent means of holding the device to the edge of the pool. The housing 12 is adjusted up or down to position the water level of the swimming pool to be approximately midway of the opening 20 in the sidewall 14. To keep the portable skimmer from floating while being installed and to assure a positive flow of water through the skimming device, the connector 24 and the flexible hose 26 are filled with water. To start water circulation through the portable skimmer the adapter 30 on the end of the flexible hose is attached to the inlet of the pool skimmer. The strainer, if any is present in the pool skimmer, is removed to permit the adapter to be inserted directly into the pool skimmer inlet. Debris from the pool will be drawn into the portable skimmer as long as the water level is sufficient to permit surface water to be drawn into the opening 20. The screen 22 will hold the debris as water passes through and the debris may be periodically removed from the portable skimmer device.

The intended use of the portable skimmer of this invention functions not only as a skimmer but also as a water saver. Rather than add or remove water from the swimming pool to keep the pool skimmer in operation, the present portable skimmer is to be raised or lowered by sliding the housing 12 along slit tube 36 in the support 32 as the level of the water in the pool changes. In making such changes in the portable skimmer level there is no need to add or remove water from the swimming pool. A substantial portion of any water lost by evaporation or by splashing will be replaced by rain water. Clearly the upper and lower limits of the water levels which will be acceptable for operation and maintenance of the swimming pool will be greatly increased.

Thus, it can be seen from the foregoing description and the illustrated embodiment that the present invention provides a novel, selfcontained portable skimmer and water saver. The skimmer my be readily and economically constructed from a synthetic plastic material, and is relatively simple to adjust, clean and maintain.

While a particular embodiment of the invention has been shown and described, it will be obvious to those skilled in the art that changes and modifications may be made without departing from the invention.

What is claimed is:

1. A portable skimmer and water saver device for use with a swimming pool, said pool including circulating pump means with a permanently positioned debris skimmer, said device comprising: an elongated tubular housing, a filter means for collecting debris, a debris director, a flow connector tube, a flexible hose and an adjustable support means for supporting said device onto the edge of a swimming pool, said housing comprises a sidewall, a top and a bottom, said sidewall is provided with an opening located near said top, said flow connector tube is attached to said bottom and said filter means is located inside said housing between said opening and said flow connector tube, said adjustable support means comprises a U-shaped clip attached near the top of a slit tube, a holder tube frictionally held in said slit tube, said holder tube is connected to said housing sidewall to permit said housing to be adjusted by sliding along the length of said slit tube.

2. The skimmer and water saver device as set forth in claim 1 wherein said housing is cylindrical and said opening extends a substantial distance along and around said sidewall for surface water and debris floating on the water to enter said housing, and said filter means is a screen.

3. The skimmer and water saver device as set forth in claim 1 wherein said debris director is a sheet material attached to said sidewall of said housing and extends outwardly past said slit tube for abutting against the side of a swimming pool and has sufficient length to extend above and below said opening.

4. The skimmer and water saver device as set forth in claim 1 wherein said flexible hose is connected to said flow connector and is provided with an adapter at its free end, said adapter provides means for attachment of said flexible hose to the input of a swimming pool skimmer.

5. A portable skimmer and water saver device for use with a swimming pool, said pool including circulating pump means with a permanently positioned debris skimmer, said device comprising: an elongated cylindrical housing with a top, sidewall and bottom, said housing has an opening in said sidewall located near the upper portion thereof and extends a substantial distance along and around said sidewall, a connector tube is attached to said bottom, a flexible hose provided with an adapter attached to the free end for attachment of said flexible hose to the debris skimmer of a swimming pool is connected to the connector tube, a filter screen is positioned inside said housing between said bottom and said opening for collecting debris from the surface water of a swimming pool, a holder tube attached to said sidewall of said housing is frictionally held inside a slit tube for movably holding the housing at any desired position along said slit tube, a debris director of sheet material is attached to the side of said housing and extends outwardly therefrom for contacting the side of a swimming pool so debris will be directed toward said opening in said sidewall, a resilient spring clip is attached to the upper portion of said slit tube for clamping and holding said device to the edge of a swimming pool.

* * * * *